(12) United States Patent
Boday et al.

(10) Patent No.: US 8,829,082 B2
(45) Date of Patent: Sep. 9, 2014

(54) SELF-HEALING MATERIAL WITH ORTHOGONALLY FUNCTIONAL CAPSULES

(75) Inventors: Dylan J. Boday, Tucson, AZ (US); Joseph Kuczynski, Rochester, MN (US); Jason T. Wertz, Wappinger Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/482,366

(22) Filed: May 29, 2012

(65) Prior Publication Data
US 2013/0324639 A1 Dec. 5, 2013

(51) Int. Cl.
C08L 83/00 (2006.01)

(52) U.S. Cl.
USPC .......................................... 523/202; 524/507

(58) Field of Classification Search
USPC .......................................... 523/202; 524/507
See application file for complete search history.

(56) References Cited

U.S. PATENT DOCUMENTS

| | | | |
|---|---|---|---|
| 3,968,060 A | | 7/1976 | Vincent et al. |
| 4,138,356 A | | 2/1979 | Vincent et al. |
| 4,428,983 A | | 1/1984 | Nehen et al. |
| 4,708,812 A | * | 11/1987 | Hatfield .......................... 252/70 |
| 5,232,780 A | | 8/1993 | Nuyken et al. |
| 6,518,330 B2 | | 2/2003 | White et al. |
| 6,846,854 B2 | | 1/2005 | Wagner et al. |
| 7,108,914 B2 | | 9/2006 | Skipor et al. |
| 7,723,405 B2 | | 5/2010 | Braun et al. |
| 7,799,849 B2 | | 9/2010 | Raravikar et al. |
| 7,811,666 B2 | | 10/2010 | Dry |
| 7,977,396 B2 | | 7/2011 | Maurer et al. |
| 2004/0007784 A1 | * | 1/2004 | Skipor et al. .................. 257/788 |
| 2008/0299391 A1 | * | 12/2008 | White et al. ............. 428/402.21 |
| 2009/0078918 A1 | | 3/2009 | Huettner et al. |
| 2009/0258042 A1 | | 10/2009 | Anastasiou et al. |
| 2010/0285313 A1 | | 11/2010 | Zhang et al. |
| 2010/0331441 A1 | | 12/2010 | Lancaster et al. |
| 2011/0039980 A1 | | 2/2011 | Caruso et al. |
| 2013/0324639 A1 | | 12/2013 | Boday et al. |

FOREIGN PATENT DOCUMENTS

DE 102009020638 A1 11/2010

OTHER PUBLICATIONS

"Ally ethers." Organic Chemistry Portal, http://www.organic.chem/org/protective groups.hydroxy/allylether.htm, Retrieved online Jul. 13, 2013.*
Blaiszik et al., "Microcapsules filled with reactive solutions for self-healing materials", Polymer, (Received Oct. 1, 2008/Accepted Dec. 22, 2008/Available online Dec. 27, 2008/Published Feb. 2, 2009), pp. 990-997, vol. 50, No. 4, Published by Elsevier.
Hupp et al., "Functional Nanostructured Molecular Materials", The Electrochemical Society Interface, Fall 2001, pp. 28-32, vol. 10, No. 3, Published by Electrochemical Society, Inc., Pennington, NJ.
Im et al., "Patterning Nano-Domains with Orthogonal Functionalities: Solventless Synthesis of Self-Sorting Surfaces", Optical Data Storage Topical Meeting, 2009, Conference May 10-13, 2009, (Date of current version May 29, 2009) © 2009 IEEE, pp. 73-75.
Joralemon et al., "Shell Click-Crosslinked (SCC) Nanoparticles: A New Methodology for Synthesis and Orthogonal Functionalization", J. Am. Chem. Soc., Nov. 9, 2005 (Received Jun. 14, 2005), pp. 16892-16899, vol. 27, No. 48, © American Chemical Society. doi: 10.1021/ja053919x.
O'Reilly, et al., "Preparation of orthogonally-functionalized core Click cross-linked nanoparticles", New Journal of Chemistry, 2007, 31, pp. 718-724, (Received Nov. 6, 2006/Accepted Nov. 28, 2006/First Published Jan. 22, 2007). doi: 10.1039/b616/03k.
Tsinberg, "Evaluation of Novel Autonomous Self-Healing Polymer Composite", Massachusetts Institute of Technology, Sep. 2008, pp. 1-64, © Anait Tsinberg. URl: http://hdl.handle.net/1721.1/45355.
H. Marand—Virginia Tech Chemistry Dept. lecture—"Polymerization Reactions", online Feb. 1, 2011 retrieved Feb. 9, 2014 http://www.files.chem.vt.edu/chem-dept/marand/Lecture5.pdf.

* cited by examiner

*Primary Examiner* — Hannah Pak
(74) *Attorney, Agent, or Firm* — Shane O. Sondreal; Robert R. Williams

(57) ABSTRACT

A self-healing capsule may contain a self-healing agent, a polymer shell encapsulating the self-healing agent, and at least one functional group orthogonal to the surface of the polymer shell. This self-healing capsule may be covalently bonded into a polymeric material by the orthogonal functional group. The self-healing capsules may be formed through microencapsulation.

10 Claims, 3 Drawing Sheets

SELF-HEALING MATERIAL WITH ORTHOGONALLY FUNCTIONAL CAPSULES

TECHNICAL FIELD

This invention relates to the field of self-healing materials. More particularly, it relates to the field of self-healing agents, encapsulated by a polymer, and containing orthogonal functional groups covalently bonded into a polymeric matrix.

BACKGROUND

Polymeric materials are used in many applications, including paints, upholstery, pipes, and circuit boards. Polymeric materials can undergo degradation due to a number of factors, including heat, chemicals, and mechanical forces.

SUMMARY

In one embodiment, a material for releasing a self-healing agent includes a polymeric substrate and a capsule dispersed in the polymeric substrate. The capsule may have a polymer shell, a self-healing agent enclosed in the capsule, and an orthogonal functional group attached to the capsule and covalently bonded with the polymeric substrate.

In another embodiment, a method for creating a material includes creating a microemulsion containing a continuous phase and a dispersed phase, and initiating polymerization to create a polymer capsule with orthogonal functional groups. The continuous phase may include monomers having one or more orthogonal functional groups, and the dispersed phase may include a self-healing agent.

In another embodiment, a method for creating a self-healing material includes receiving orthogonally functional capsules containing a self-healing agent and covalently bonding the capsules into a polymeric substrate.

BRIEF DESCRIPTION OF THE DRAWINGS

Embodiments are illustrated by way of example, and not by way of limitation, in the figures of the accompanying drawings in which reference numerals refer to similar elements.

FIG. 1a depicts a self-healing capsule without a polymeric surfactant, while

DETAILED DESCRIPTION

Polymeric materials can undergo degradation due to a number of factors, including heat, chemicals, and mechanical forces. One result of polymer degradation is cracking of the polymer. Cracking may occur throughout the polymeric material, both on the outside surface where the cracks may be visually detected, and on the inside surface where cracks may go unseen. These cracks can lead to equipment failure in circuit boards, fluid piping systems, and other applications with polymeric materials.

According to embodiments of the invention, a capsule may contain a self-healing agent which may assist in healing a material. The capsule may include a polymer shell encapsulating the self-healing agent and at least one functional group orthogonal to the surface of the polymer shell. The functional group orthogonal to the surface of the polymer shell may be referred to in this Description and in the Claims as an "orthogonal functional group." This self-healing capsule may be covalently bonded into a polymeric material by the orthogonal functional group. The self-healing capsules may be formed through microencapsulation.

Figure 1A:
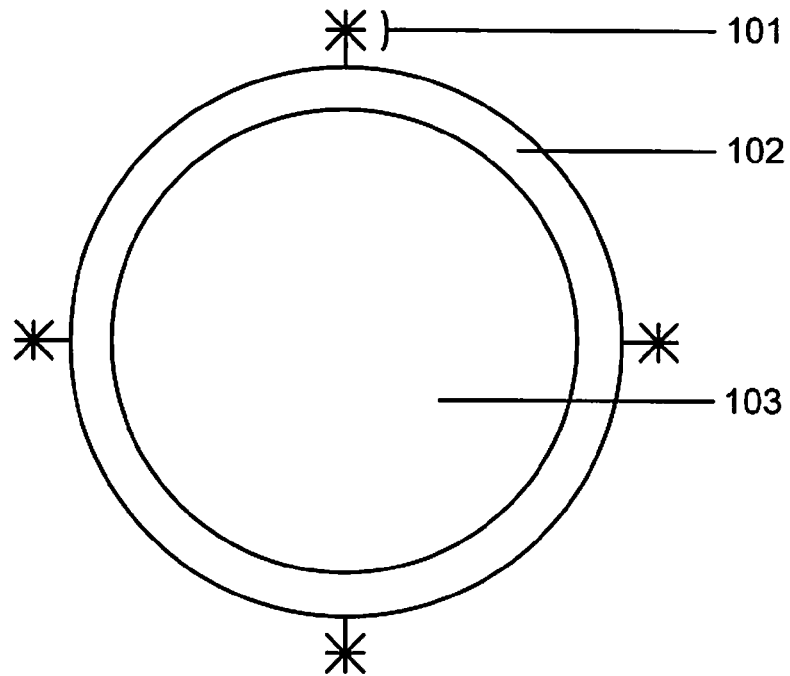

FIG. 1a depicts a capsule used in a self-healing material, according to an embodiment of the invention. A self-healing agent 103 is encapsulated by a polymer layer 102. Attached to the polymer layer 102 is a functional group 101 orthogonal to the surface of the polymer layer 102.

Self-Healing Mechanisms

When a crack forms in a polymeric material containing self-healing capsules, the crack may rupture a capsule, causing a self-healing agent contained in the capsule to flow into the crack.

Figure 2:
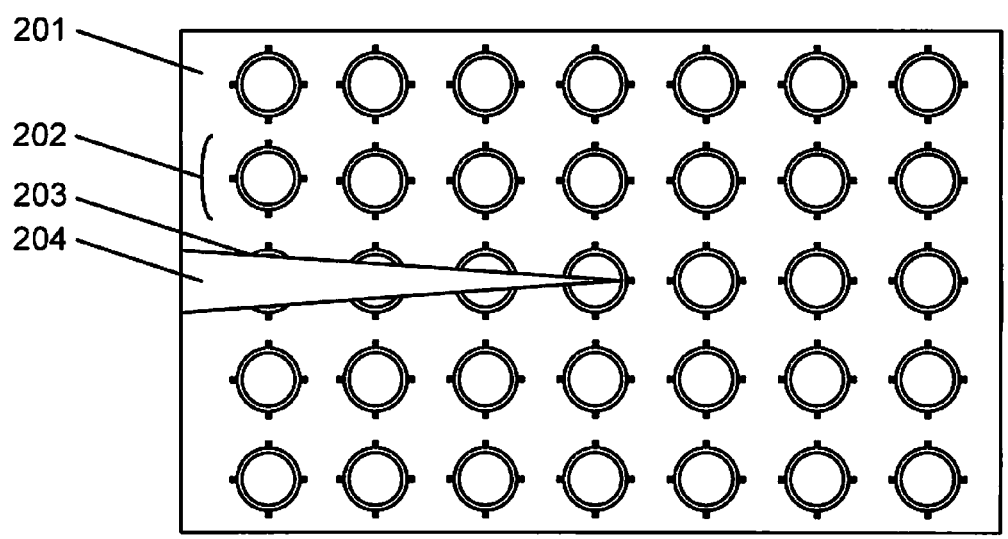
FIG. 2 illustrates a self-healing mechanism for a crack and self-healing capsule rupture, according to embodiments of the invention.

FIG. 2 represents a two dimensional cross-sectional diagrammatic representation of a crack in a polymeric material having capsules that contain a self-healing agent, according to an embodiment of the invention. FIG. 2 illustrates how a crack 204 may lead to the rupture of some of the capsules 202. The capsules 202 are embedded in and covalently bonded with a polymeric material 201 through orthogonal functional groups on the capsules. When a crack 204 forms, it may create a capsule rupture 203, causing a self-healing agent to flow into the crack 204. There are several mechanisms by which the self-healing agent may act to heal the crack, including a monomer/catalyst system and a solvent system, discussed below.

Monomer/Catalyst System

In one embodiment of the invention, a mechanism for self-healing involves a system containing a monomer and a catalyst capable of initiating polymerization of the monomer. In this system, the monomer is the self-healing agent. A catalyst and a capsule containing a monomer are dispersed in a polymeric material. After the monomer flows into the crack, it may contact the catalyst, causing the monomer to polymerize and fill the crack.

The system works with a wide variety of catalysts and monomers. Monomers may be chosen for their chemical and physical properties, such as low melting point or viscosity, or the surrounding polymeric material's properties, such as residual functionality, depending on the intended application and material conditions. The monomers that may be used include, but are not limited to, dicyclopentadiene, cyclooctadiene, norbornene, cyclic olefins, lactones, acrylates, acrylic acids, styrenes, isoprene, butadiene, and epoxies. Additionally, other compounds may be bonded to monomers to change the monomer's chemical and physical properties, such as melting point and viscosity. These compounded monomers include, but are not limited to, substituted norbornene compounds, substituted cyclooctadiene compounds, and isocyanate-functionalized compounds.

In an embodiment of the invention, catalysts may be selected for their ability to initiate polymerization with a selected self-healing agent. The catalysts that may be used include, but are not limited to, metal complex catalysts including ruthenium(II) carbenoid Grubbs' catalysts such as bis(tricyclohexylphosphine)benzylidine ruthenium(IV) dichloride; molybdenum(VI) Schrock's catalysts such as 2,6-diisopropylphenylimidoneophylidene molybdenum(VI) bis(t-butoxide); and tungsten(VI) Schrock's catalysts. In an alternative embodiment of the invention, at least some of the self-healing capsules contain a catalyst.

In a further embodiment of the invention, the self-healing process is achieved through ring-opening metathesis polymerization. This is a chain-growth polymerization reaction involving a strained cyclic compound, such as cyclopentene, which opens to form double bonds with other monomers. Ideally a highly strained (>4 kcal/mol) cyclic compound may be used, though a lesser strained cyclic compound may be suitable. The figure below illustrates ring-opening polymerization using dicyclopentadiene.

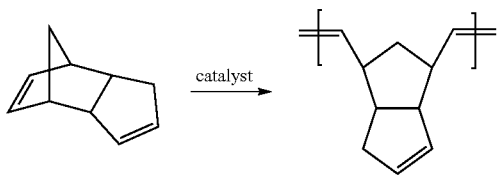

The cyclic compound polymerizes in the presence of a first generation Grubbs' catalyst or a Schrock's catalyst.

Solvent System

In another embodiment of the invention, a mechanism for self-healing involves a system containing a solvent and an undercured self-healing material having residual groups. A capsule is filled with a solvent and upon rupture of the capsule by a crack, the solvent flows into the crack as well as into the polymeric matrix of the self-healing material through the surfaces of the crack faces. The solvent may cause polymerization of undercured polymeric material between the faces to restart and continue, thereby healing the crack.

The extent to which constituent monomers of a polymeric material polymerize is a function of temperature; the higher the temperature used in polymerization, the greater the conversion of the monomers to polymers. An undercured polymeric material may continue polymerizing if the temperature at which monomers become mobile, the glass transition temperature, is reached. The relationship between conversion and glass transition temperature is represented by the DiBenedetto equation:

$$T_g = T_{g,o} + \frac{\lambda \alpha (T_{g,\infty} - T_{g,o})}{1 - (1 - \lambda)\alpha}$$

where $\alpha$ is the conversion of the monomers into the polymeric material, $T_g$ is the glass transition temperature at the particular conversion $\alpha$, $T_{g,o}$ is the glass transition temperature of the uncured material, $T_{g,\infty}$ is the glass transition temperature of the fully cured material, and $\lambda$ is a structure-dependent parameter. By mobilizing unreacted monomers, a solvent effectively lowers the localized glass transition temperature for an area, so that the area in which the solvent is present can continue polymerization if the temperature is above this lowered glass transition temperature. In this way, the solvent may restart polymerization in an undercured material, through which the faces of the crack may be joined. For example, if the polymeric material is an epoxy, adding a solvent such as chlorobenzene may cause unreacted epoxy curing agent to move and restart polymerization with epoxy resin at the crack face, without the need to raise the temperature of the system to advance polymerization. The solvent may also cause swelling in the polymeric material. As the area in which the solvent is present expands, the faces of the crack may be brought together. This swelling and the continued polymerization may cause the crack faces to join together and seal the crack.

The solvents used in the self-healing process may be protic or aprotic. Additionally, the solvents may be polar or non-polar, though the less polar the solvent, the easier it is to encapsulate the solvent through in situ encapsulation, as the dispersed and continuous phases are more distinct. Non-polar or weakly polar (dielectric constant <20) aprotic solvents that may be used include, but are not limited to, hydrocarbon aromatics such as chlorobenzene, dichlorobenzene, tetrahydrofuran, phenylacetate, methyl phenylacetate, ethyl phenylacetate, anisole, iodobenzene, and toluene. Moderately polar (dielectric constant ~20-50) aprotic solvents that may be used include, but are not limited to, acetonitrile, dimethylacetamide, dimethylformamide, dimethyl sulfoxide, and methylpyrrolidone. Protic solvents that may be used include, but are not limited to, alcohols such as butanol and ethanol.

In another embodiment of the invention, the capsule may contain a monomer to aid in polymerization, along with a solvent. This monomer may be any type of monomer, but is preferably the same monomer used in the polymeric material in which the self-healing agent is embedded. For example, if the self-healing capsule is embedded in an epoxy matrix, the self-healing capsule may include 15 wt % epoxy curing agent along with a solvent, such as chlorobenzene.

Capsule Structure and Formation

According to embodiments of the invention, the self-healing capsules may be formed through microencapsulation. Microencapsulation methods include in situ polymerization and interfacial polymerization. Both of these methods of polymerization are based on emulsion systems.

In an embodiment of the invention, a capsule is formed through interfacial polymerization. Interfacial polymerization involves polymerization of one or more reactant monomers at the interface of two liquid phases, the continuous phase and dispersed phase. One or more monomers from the dispersed phase polymerize with one or more monomers from the continuous phase at the interface of the two phases. The rate of polymerization exceeds the rate of diffusion of the newly formed polymer away from the interface, and the polymer condenses at the interface of the two phases, forming a wall between the aqueous phase and dispersed phase.

In another embodiment of the invention, a self-healing capsule is formed through in situ polymerization. In situ polymerization involves a process similar to interfacial polymerization, except that no reactant monomers are part of the dispersed phase. Like interfacial polymerization, in situ polymerization occurs at the interface of the continuous and dispersed phases; however, only monomers in the continuous phase polymerize. This polymerization forms a capsule wall between the continuous and dispersed phases.

In one embodiment of the invention, a polymeric surfactant is dispersed in water to form an aqueous solution. A monomer and cross-linking agent are added to the aqueous solution, where the cross-linking agent has a functional group. A self-healing agent is added to the aqueous solution to form a dispersion, where the self-healing agent forms the dispersed phase and the aqueous solution forms the continuous phase. The polymeric surfactant surrounds the self-healing agent and forms a micelle. A condensing agent is added to the dispersion. The condensing agent forms a polymer with the monomer and cross-linking agent at the interface of the micelle and aqueous phase, the polymer surrounding the self-healing agent and polymeric surfactant, and forming a capsule. This capsule contains the self-healing agent and polymeric surfactant enclosed in the capsule, a polymer shell, and an orthogonal functional group attached to the capsule.

Figure 1B:
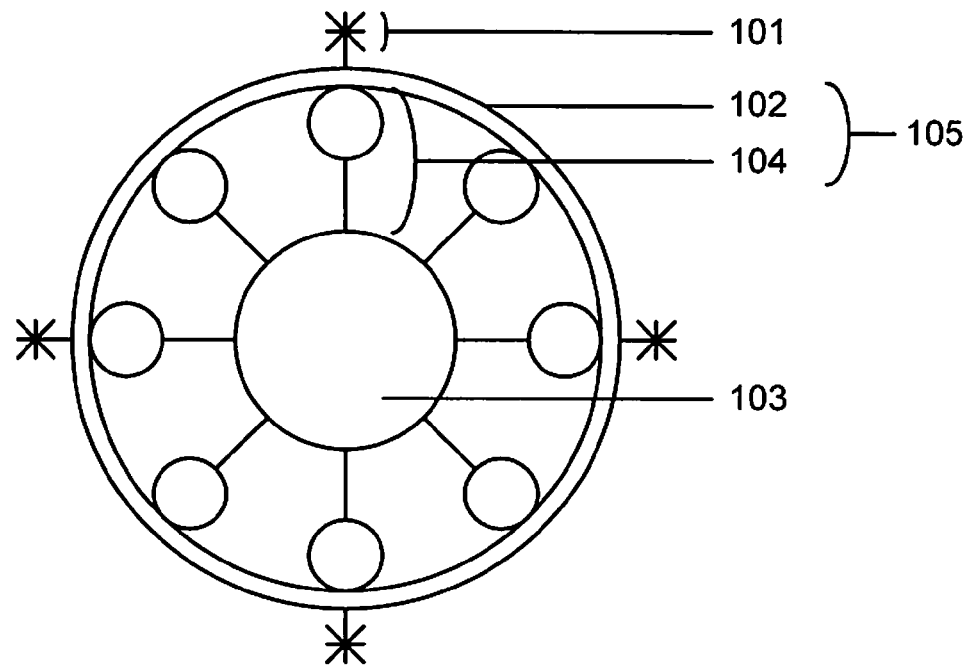
FIG. 1b depicts a self-healing capsule with a polymeric surfactant, according to embodiments of the invention.

FIG. 1b depicts the structure of a capsule formed by the in situ polymerization mechanism discussed above, according to an embodiment of the invention. A self-healing agent 103 is encapsulated by a polymeric surfactant 104, which forms a membrane around the self-healing agent 103. A polymer layer 102 deposits onto the polymeric surfactant 104. Together, the polymer layer 102 and the polymeric surfactant 104 form a capsule 105 around the self-healing agent 103. A functional group 101 is orthogonal to the polymer layer 102.

Figure 3:
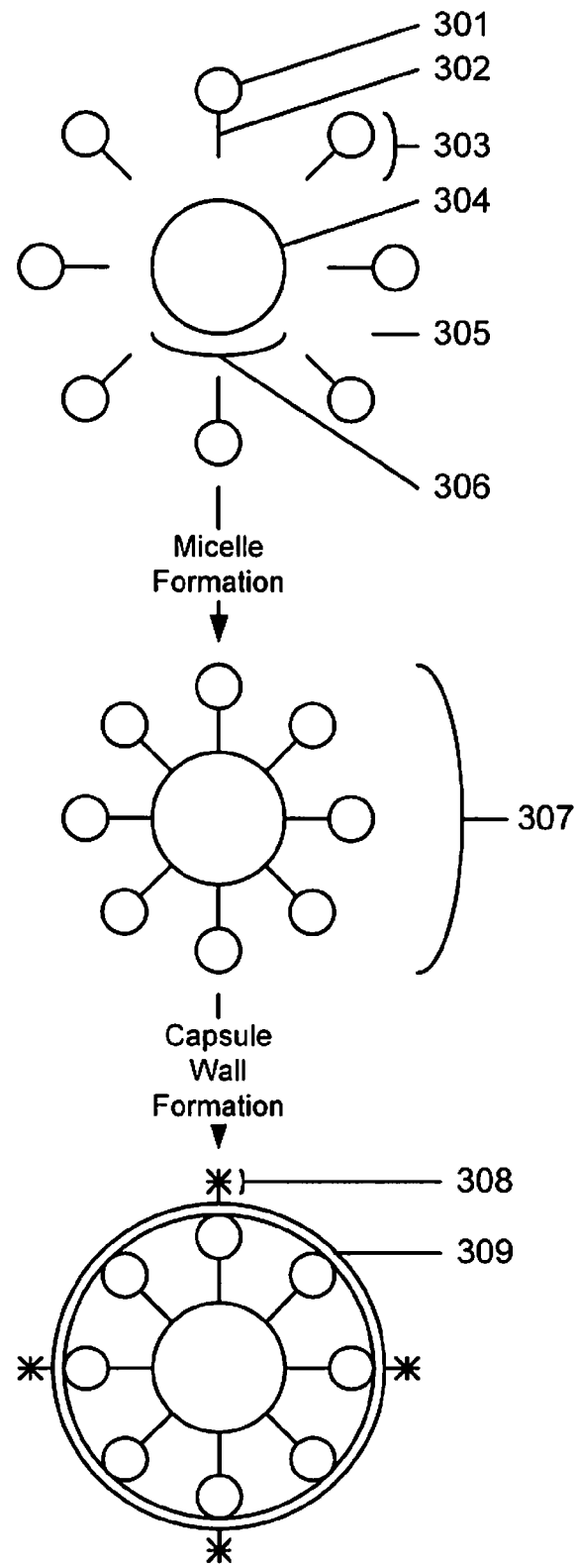
FIG. 3 depicts formation of a self-healing capsule, according to embodiments of the invention.

FIG. 3 depicts capsule formation through in situ polymerization in an oil-in-water microemulsion, according to an embodiment of the invention. A self-healing agent 304 is dispersed into a solution to form a dispersed phase 306, the dispersed phase contained in a continuous phase 305. A surfactant 303 having a polar end 301 and a non-polar end 302 is present in the microemulsion. The non-polar end 302 is attracted to the self-healing agent 304 to form a micelle 307. Monomers and cross-linking agents are dispersed into the solution. The capsule wall 309 is formed by initiating polymerization of the monomers and cross-linking agents in the continuous phase 305, with the polymer depositing at the polar end 301 of the surfactant. The cross-linking agent contains a functional group 308 which, after capsule wall formation, is oriented orthogonally from the capsule wall 309.

In another embodiment of the invention, a self-healing agent is contained within a polymer shell formed from urea, formaldehyde, and resorcinol-group copolymers. A self-healing agent is surrounded by a surfactant, in this case a polymeric emulsifying agent. Urea and formaldehyde form a shell around this polymeric emulsifying agent. The urea-formaldehyde polymer formation is as follows:

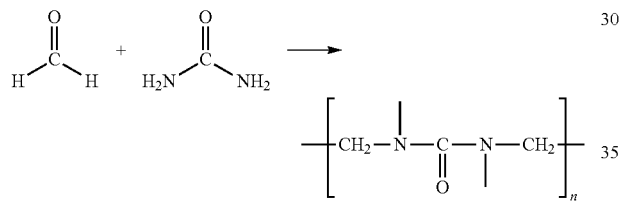

As the urea-formaldehyde polymer forms, it condenses at the interface of the continuous and dispersed phases, forming a shell around the dispersed phase. The resorcinol-group copolymer acts as a cross-linking agent to the urea-formaldehyde polymers, forming part of the polymer shell. The polymeric emulsifying agent acts as a site at which the urea-formaldehyde-resorcinol polymer condenses. For example, in an embodiment of the invention, if the polymeric emulsifying agent is ethyl methacrylate, the urea-formaldehyde-resorcinol shell will form at the carboxyl groups of the ethyl methacrylate. This resorcinol-group copolymer also contains an orthogonal functional group. After formation of the urea-formaldehyde-resorcinol shell, the shell contains orthogonal functional groups on its surface for bonding into a polymeric substrate.

In various embodiments of the invention, other monomers and condensing agents may be used to form a polymer shell. These other monomers and condensing agents may include, but are not limited to, melamine, polyamine, phenol, and acetaldehyde.

The self-healing capsules may be controlled for size, both for the capsule and the capsule shell. The thickness of the capsule shell may be controlled by the concentration of the monomers in the polymerization reaction, the temperature of the polymerization reaction, and length of time the polymerization reaction is allowed to continue, as well as other general factors dictating chemical reactions. It may be desirable to have a thinner capsule wall, depending on the properties of the polymeric material into which the self-healing capsule is bonded or the application of the polymeric material. For example, the capsules may be from 10-100 microns thick, depending on factors such as the properties and application of the surrounding polymeric material.

Orthogonal Functionality and Polymeric Substrate

Once the self-healing capsules are formed, they may be dispersed into a polymeric substrate. Orthogonal functional groups on the self-healing capsules enable the capsules to covalently bond directly into the polymeric substrate's matrix. For example, the capsule may have allyl functional groups, which would allow it to be integrated into a polystyrene polymer matrix.

In an embodiment, self-healing capsules are formed with orthogonally functional cross-linking agents, which may be any cross-linking agents with functional groups that create orthogonal functional groups on the capsule once the capsule is formed. The orthogonally functional cross-linking agent may be a resorcinol compound with a functional group, such as an allyl. For example, an oxygen atom in a hydroxyl group of phloroglucinol may bond with the first position carbon in allyl chloride to form resorcinol with a propenyloxy group as shown below. The two hydroxyl groups of the resorcinol compound may still be available for cross-linking. Other compounds that may create an appropriate orthogonal functional group may include, but are not limited to, vinyl chloride (vinyl-functionalized), (meth)acryloyl chloride ((meth)acrylate-functionalized), and epochlorohydrin (epoxy-functionalized), depending on the orthogonal functional group desired.

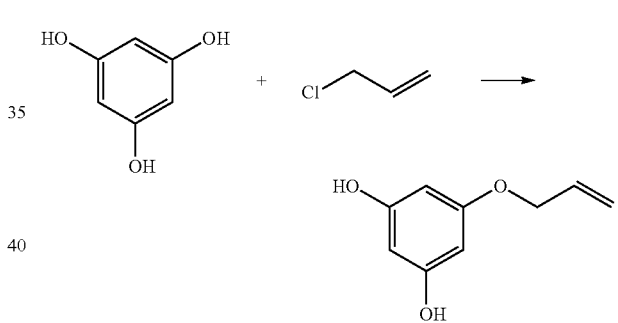

Orthogonal functional groups attached to the self-healing capsules may be selected based on composition of the polymeric substrate in which the self-healing capsule will be incorporated. For example, if the polymeric substrate is a polyamide, the orthogonal functional group attached to the self-healing capsule may be an amide group. The orthogonal functional groups that may be used include, but are not limited to, allyls, esters, epoxies, acrylates, amides, amines, urethanes, urea, siloxane, alkoxysilane, carbonates, sulfides, ethers, and aldehydes. Additionally, the orthogonal functional group introduced by the cross-linking agent can be further modified with an alternative functional group, including any of the aforementioned functional groups, so that the functional group used for bonding into the polymeric substrate may be different from the functional group attached to the orthogonally functional cross-linking agent. An alternative functional group may be added to a functional group of a cross-linking agent before capsule formation or added to an orthogonal functional group of a self-healing capsule after capsule formation.

An orthogonal functional group may covalently bond into a surrounding polymeric substrate. This covalent bonding promotes adhesion of the capsule wall to the polymeric substrate surrounding the capsule so that in the event of a crack, this increased adhesion may cause greater capsule deformation than might otherwise occur with a capsule not covalently bonded to the substrate. An orthogonal functional group acts as an anchor into the polymeric substrate, so that when a crack propagates through the polymeric substrate, self-healing capsules along and near the crack may be pulled by the separating crack faces, and the tension caused by opposing forces may cause the capsule wall to break. Any self-healing capsule that is near enough to the crack or other areas of deformation such that the associated forces are sufficiently strong may rupture or break. For example, if the tension to break a capsule is X tension and the adherence between the capsule and the polymeric substrate is ½ X tension, as may be found in a capsule not covalently bonded into a substrate, the capsule may not break and the crack may circumvent the capsule. However, if the adherence between the capsule and the polymeric substrate is increased to 2 X tension through covalent bonding of the capsule to the polymeric substrate through one or more orthogonal functional groups, the capsule is likely to break and release self-healing agent into the crack.

Additionally, the covalent bonding of the orthogonal functional group may help prevent leaching of the self-healing capsules out of the polymeric substrate during formation and use of the polymeric material. This may both increase yield and decrease the amount of substance leached into the environment.

According to embodiments of the invention, a self-healing capsule may be incorporated into a variety of polymeric substrates. The polymeric substrates include, but are not limited to, polyesters, polyamides, polyurethane, polyurea, polysiloxane, polycarbonates, polysulfides, polyethers, and phenol formaldehydes. The type of polymer to be used will depend on the type of orthogonal functional group attached to the self-healing capsule, and vice versa. The polymeric substrates may be formed by any suitable method, including step growth, chain growth, or controlled growth polymerization methods.

The self-healing capsules may be dispersed into the polymeric substrate through any suitable method of dispersion and polymer formation, such as colloidal dispersions. In an embodiment of the invention, the self-healing capsules are dispersed into a monomer solution, after which polymerization of the monomer solution is initiated. The self-healing capsules may form covalent bonds with other polymers, becoming part of the polymer matrix.

Experimental Protocols

The following illustrative experimental protocols are prophetic examples which may be practiced in a laboratory environment.
Formation of Orthogonally Functional Resorcinol, Phloroglucinol, Allyl Chloride Solution A contains phloroglucinol and water. Solution B contains allyl chloride, triethyl amine, and tetrahydrofuran (THF). Solution B is added to solution A and kept in a cold bath at 0° C.
Formation of Self-Healing Capsule; EMA Copolymer, URF Shell Solution A is an aqueous solution containing 2.5 g urea, 0.25 g ammonium chloride, 25 mL EMA copolymer, and 0.25 g resorcinol with an orthogonal functionality. The pH of Solution A is adjusted to 3.5 through the addition of sodium hydroxide and hydrochloric acid. A self-healing agent and a polymeric solvent, silicone oil, are added to Solution A to form Solution B. 6.33 g formalin is added to Solution B, forming microcapsules. The microcapsules are washed and sieved.
Formation of Self-Healing Material; Self-Healing Capsules with Amine Functional Groups, Polyetheramine Polymer Matrix. Aliphatic Polyisocyanate 4.50 g of Basonat® HI-100 (aliphatic polyisocyanate) and 225 mg self-healing capsules having orthogonal amine functional groups were added to 100 ml of acetone in a 250 ml plastic flask. 26.5 g Jeffamine® D-2000 (polyetheramine) were added to 75 ml of acetone in a 250 ml plastic flask. The two solutions were mixed and stirred for 5 minutes, dispersed onto a flat glass surface, and left to dry for 24 hours.

What is claimed is:

1. A method for creating a material, comprising:
creating a microemulsion, including a continuous phase and a dispersed phase, the continuous phase including first monomers and second monomers of a different chemical compound than the first monomers, wherein the first monomers have one or more orthogonal functional groups, and the dispersed phase including a third monomer and a self-healing agent that is selected from the group consisting of a solvent and a fourth monomer; and
initiating polymerization of the first monomers to create a polymer shell with orthogonal functional groups integrated therein.

2. The method of claim 1, wherein the first monomers are resorcinol compounds, the second monomers are urea, and the initiation of polymerization includes adding formaldehyde to the microemulsion.

3. The method of claim 1, wherein the microemulsion further comprises a surfactant.

4. The method of claim 3, wherein the first monomers are resorcinol compounds, the second monomers are urea, the surfactant is ethyl methacrylate, and the initiation of polymerization includes adding formaldehyde to the microemulsion.

5. A method for making a material, comprising:
creating self-healing capsules, that include a self-healing agent and one or more orthogonal functional groups attached to a shell, from a microemulsion that includes:
a continuous phase with first monomers having the one or more orthogonal functional groups and second monomers of a different chemical compound than the first monomers, and
a dispersed phase with a third monomer and the self-healing agent, the self-healing agent being selected from the group consisting of a solvent and a fourth monomer;
combining fifth monomers and the self-healing capsules including a self-healing agent, with the one or more orthogonal functional groups attached to the shells of the self-healing capsules; and
initiating polymerization of the fifth monomers to create a polymeric substrate with the self-healing capsules and the one or more orthogonal functional groups integrated therein.

6. The method of claim 5, wherein the self-healing capsules further comprise a surfactant.

7. The method of claim 5, wherein polymerization is initiated through step growth, chain growth, or controlled growth polymerization.

8. The method of claim 5, wherein the fifth monomers are selected from a group consisting of esters, amides, urethanes, urea, siloxane, carbonates, sulfides, ethers, and phenol formaldehydes.

9. The method of claim 5, wherein the one or more orthogonal functional groups are selected from the group of allyls, vinyls, esters, epoxies, acrylates, amides, amines, urethanes, urea, siloxane, alkoxysilanes, isocyanates, carbonates, sulfides, ethers, and aldehydes.

10. The method of claim 5, wherein the self-healing agent in at least some of the capsules is a catalyst.

* * * * *